US012743767B2

(12) United States Patent
Pei et al.

(10) Patent No.: US 12,743,767 B2
(45) Date of Patent: Sep. 22, 2026

(54) 3D OPTICAL SENSOR ALIGNMENT

(71) Applicant: Cepton Technologies, Inc., San Jose, CA (US)

(72) Inventors: Jun Pei, Saratoga, CA (US); Dongyi Liao, Mountain View, CA (US); Liqun Han, Pleasanton, CA (US)

(73) Assignee: Cepton Technologies, Inc., San Jose, CA (US)

(*) Notice: Subject to any disclaimer, the term of this patent is extended or adjusted under 35 U.S.C. 154(b) by 328 days.

(21) Appl. No.: 18/392,488

(22) Filed: Dec. 21, 2023

(65) Prior Publication Data

US 2024/0212128 A1 Jun. 27, 2024

Related U.S. Application Data

(60) Provisional application No. 63/435,117, filed on Dec. 23, 2022.

(51) Int. Cl.
*G06T 7/00* (2017.01)
*G06T 7/73* (2017.01)

(52) U.S. Cl.
CPC ................ *G06T 7/001* (2013.01); *G06T 7/74* (2017.01)

(58) Field of Classification Search
CPC ......... G06T 7/001; G06T 7/74; G01S 7/4972; G01S 17/931; G01S 17/88
See application file for complete search history.

(56) References Cited

U.S. PATENT DOCUMENTS 3,890,552 A 6/1975 Devol et al.
4,146,924 A 3/1979 Birk et al.
4,598,456 A 7/1986 McConnell
4,980,971 A 1/1991 Bartschat et al.
5,068,588 A 11/1991 Kubota et al.
8,668,423 B2 3/2014 Motonaga
8,885,040 B2 11/2014 Puah et al.
9,264,592 B2 2/2016 Rodda et al.
9,715,611 B2 * 7/2017 Li ...................... G06K 7/10683
10,451,740 B2 10/2019 Pei et al.
10,690,754 B2 6/2020 Pei et al.
10,708,471 B2 7/2020 Weissig et al.
11,686,818 B2 6/2023 McCord et al.
2007/0087630 A1 4/2007 Ku
(Continued)

FOREIGN PATENT DOCUMENTS

CN 106501175 A 3/2017
EP 0 301 255 A1 2/1989
(Continued)

OTHER PUBLICATIONS

Klamt, Tobias, et al., “Remote Mobile Manipulation with the Centauro Robot: Full-body Telepresence and Autonomous Operator Assistance,” Journal of Field Robotics (JFR), Wiley, pp. 1-41 (Aug. 5, 2019).

*Primary Examiner* — Tom Y Lu
(74) *Attorney, Agent, or Firm* — Kilpatrick Townsend & Stockton LLP

(57) ABSTRACT

An electro-optical component, such as a laser or detector, on a module is aligned with a base, or lens system, for an optical sensor, such as a lidar sensor. Translating stages, or a robotic arm, can be used to rotate and translate the module into position. Two or more cameras can be used for ascertaining precise alignment of the electro-optical component.

20 Claims, 9 Drawing Sheets

(56) References Cited

U.S. PATENT DOCUMENTS

| | | | |
|---|---|---|---|
| 2015/0120047 A1 | 4/2015 | Motoyoshi et al. | |
| 2017/0177915 A1* | 6/2017 | Li | G06K 7/1413 |
| 2018/0153063 A1 | 5/2018 | Takama | |
| 2018/0338397 A1 | 11/2018 | Vangal-Ramamurthy et al. | |
| 2020/0241113 A1* | 7/2020 | Cullumber | G01S 7/4816 |
| 2022/0155457 A1* | 5/2022 | Gassend | G02B 27/0966 |

FOREIGN PATENT DOCUMENTS

| | | |
|---|---|---|
| EP | 1 014 438 A2 | 6/2000 |
| EP | 2 593 835 B1 | 7/2016 |
| JP | 2006-324599 A | 11/2006 |
| JP | 2016-127187 A | 7/2016 |
| KR | 10-0845419 B1 | 7/2008 |
| KR | 10-0944391 B1 | 2/2010 |
| WO | 02/28590 A1 | 4/2002 |
| WO | 02/028590 A1 | 4/2002 |
| WO | 2014/017977 A1 | 1/2014 |

* cited by examiner

3D OPTICAL SENSOR ALIGNMENT

CROSS-REFERENCES TO RELATED APPLICATIONS

This application claims the benefit of U.S. Provisional Patent Application No. 63/435,117, filed on Dec. 23, 2022, which is incorporated by reference in its entirety for all purposes.

BACKGROUND

Three-dimensional (3D) sensors can be applied in various applications, including in autonomous or semi-autonomous vehicles, drones, robotics, security applications, and the like. Lidar sensors are a type of 3D sensor that can achieve high angular resolutions appropriate for such applications. A lidar sensor can include one or more laser sources for emitting laser pulses and one or more detectors for detecting reflected laser pulses. A lidar sensor can measure the time it takes for each laser pulse to travel from the lidar sensor to an object within the sensor's field of view, then reflect off the object and return to the lidar sensor. The lidar sensor can calculate a distance how far away the object is from the lidar sensor based on the time of flight of the laser pulse. Some lidar sensors can calculate distance based a phase shift of light. By sending out laser pulses in different directions, the lidar sensor can build up a three-dimensional (3D) point cloud of one or more objects in an environment.

SUMMARY

This disclosure relates to lidars systems and, without limitation, to aligning components of a lidar system.

In some configurations, a system for aligning a component for lidar comprises a platform arranged for positioning a base on the platform; a first device comprising a first stage; and/or a second device comprising a second stage, wherein the first stage is arranged to perform a first translational motion, and the second stage is arranged to perform a second translational motion coordinated with the first translational motion to rotate a module with respect to the base to align an electro-optical device with respect to the base. In some embodiments, the system further comprises a first camera characterized by a first optical axis, a second camera characterized by a second optical axis, wherein the second camera is arranged so that the second optical axis is skew to the first optical axis, and the first camera and the second camera are arranged to acquire images of the module; and/or one or more memory devices comprising instructions that, when executed by one or more processors, performs the following steps acquiring a first image from the first camera, wherein the first image includes at least a portion of the module, acquiring a second image from the second camera, wherein the second image includes at least the portion of the module, calculating, based on the first image and the second image, a desired change in position of the module with respect to the base, transmitting a first signal to the first device for the first stage to perform the first translational motion, and/or transmitting a second signal to the second device for the second stage to perform the second translational motion coordinated with the first translational motion, based on calculating the desired change in position of the module. In some embodiments, the first camera and the second camera are arranged to point angled downward, toward the base; the first device comprises a first tension contact; the second device comprises a second tension contact; the first tension contact and the second tension contact are arranged to concurrently apply pressure to the module; the second translational motion is arranged to be parallel to and in an opposite direction of the first translational motion; the first translational motion of the first stage and the second translational motion of the second stage are arranged to rotate the module about a first axis; the first device comprises a third stage; the second device comprises a fourth stage; the third stage is arranged to translate in a direction orthogonal to the first translational motion of the first stage; the fourth stage is arranged to translate in a direction orthogonal to the second translational motion of the second stage, concurrently with translation of the third stage, to rotate the module about a second rotational axis; the first stage is a linear translation stage; the first device is three-axis motorized linear translation stage; the electro-optical device is arranged on the module to emit or detect light; and/or the first stage and the second stage are arranged to manipulate the module to align the electro-optical device with respect to the base.

In some configurations, a method for positioning a module for lidar comprises translating a first stage of a first device to perform a first translational motion; translating a second stage of a second device to perform a second translational motion coordinated with the first translational motion to rotate the module with respect to a base, wherein the module comprises an electro-optic device; and/or rotating the module aligns the electro-optic device of the module with respect to the base. In some embodiments, the method further comprises acquiring a first image from a first camera, wherein the first image includes at least a portion of the module, and the first camera is characterized by a first optical axis; acquiring a second image from a second camera, wherein the second image includes at least the portion of the module, the second camera characterized by a second optical axis, and the second camera is arranged so that the second optical axis is skew in relation to the first optical axis so that the second image of the module is skew to the first image of the module; calculating, based on the first image and the second image, a desired change in position of the module with respect to the base; moving the first stage to perform the first translational motion; moving the second stage to perform the second translational motion coordinated with the first translational motion, based on calculating the desired change in position of the module; calculating positions of at least two objects on the module from the first image and the second image to calculate the desired change in position of the module; and/or securing the module in place in relation to the base after rotating the module. The electro-optic device can be one of a plurality of electro-optic devices on the module.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

The present disclosure is described in conjunction with the appended figures.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides preferred exemplary embodiment(s) only, and is not intended to limit the scope, applicability, or configuration of the disclosure. Rather, the ensuing description of the preferred exemplary embodiment(s) will provide those skilled in the art with an enabling description for implementing a preferred exemplary embodiment. It is understood that various changes may be made in the function and arrangement of elements without departing from the spirit and scope as set forth in the appended claims.

In systems using multiple lasers and/or detectors, such as LiDAR sensors, automated alignment and/or focus setting of the lasers and/or detectors during production and/or assembly is more efficient than manual alignment and/or focus setting. Traditional methods include positioning by precise mechanical tolerances, active alignment by tuning of lasers, observing spot size and position, or use of a top-down camera to judge position based on focus of objects in the camera image. These methods, in many cases, are too slow, too expensive, and/or not accurate enough.

In some embodiments, a laser-based optical measuring or imaging system, such as lidar, will have an electro-optical module (EOM or module) containing laser(s) and/or detector(s). In some cases, these components will be mounted on a printed circuit board (PCB) that comprises the EOM. A lens is used to focus or collimate the laser light and project it towards a target and/or receive light from the target and focus it onto the detector(s). For proper operation, the EOM is precisely positioned in x, y, and z, as well as pitch, roll, and yaw, so that the laser(s) and/or detector(s) are properly aligned with respect to the lens axis and/or lens focal plane.

In some configurations, multiple modules, each module containing one or more electro-optical components, are mounted on one base. Examples of some lidar systems are disclosed in commonly owned U.S. Pat. No. 10,451,740, granted on Oct. 22, 2019, U.S. Pat. No. 10,690,754, granted on Jun. 23, 2020, and U.S. Pat. No. 11,686,818, granted on Jun. 27, 2023, the disclosures of which are incorporated by reference for all purposes. For example, FIG. 22B in the '818 patent depicts packages 2110 (e.g., modules), each comprising a plurality of optoelectronic components 2130, mounted to a base (e.g., to PCB 2240, via interposer 2220).

Figure 1:
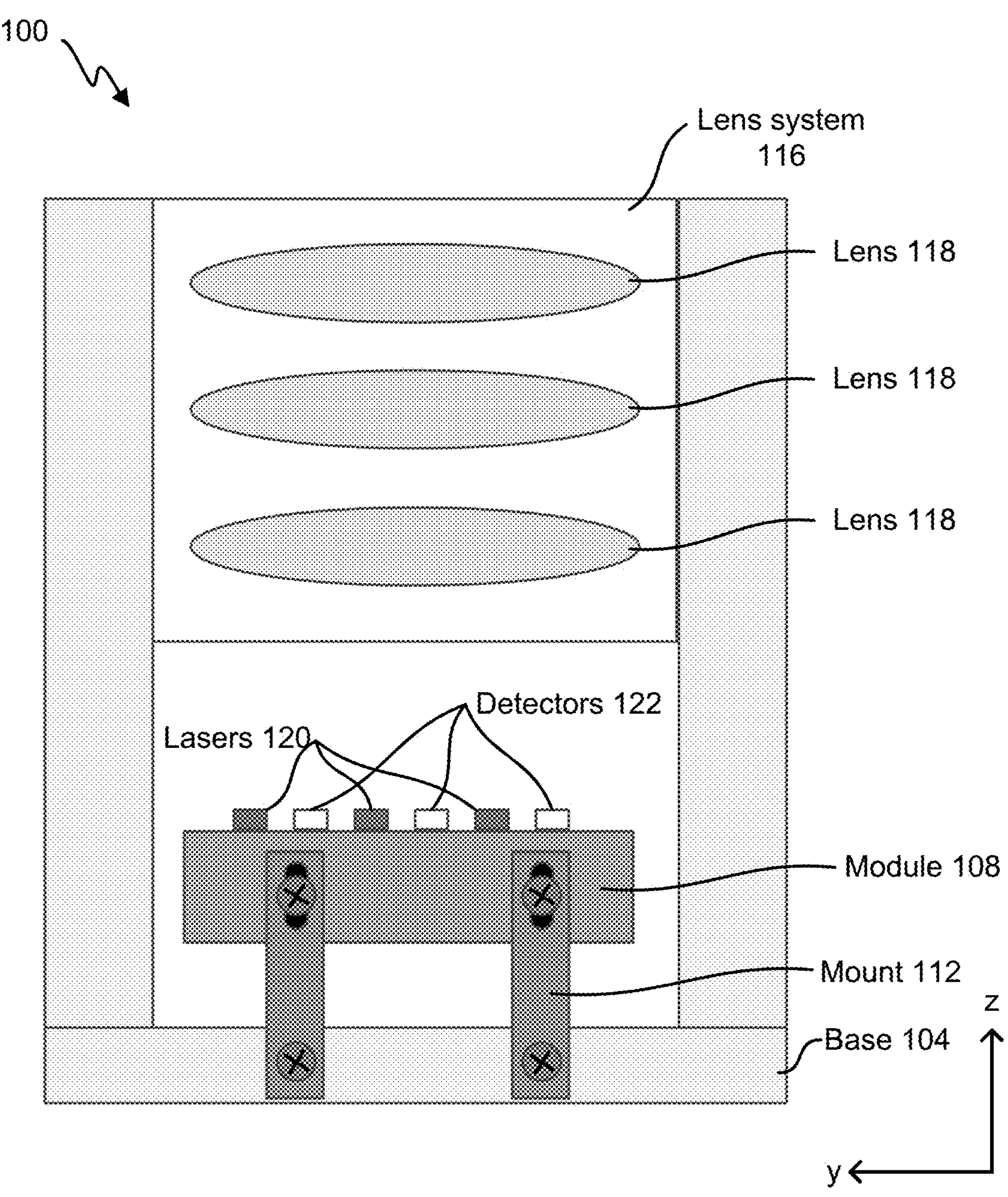
FIG. 1 depicts an embodiment of an optical system.

FIG. 1 depicts an embodiment of an optical system 100, such as a lidar system. The optical system 100 comprises a base 104, a module 108 (e.g., EOM), a mount 112 for securing the module 108 to the base 104, and a lens system 116 comprising one or more lenses 118.

One or more lasers 120 and/or one or more detectors 122 are mounted on the module 108. The mount 112 is adjustable so that the module 108 can be moved with respect to the base 104, so that the lasers 120 and/or detectors 122 are aligned with respect to the base 104 and/or aligned with respect to the lens system 116 (e.g., there is no relative movement between the base 104 and the lens system 116). The base 104 is a printed circuit board (PCB) (e.g., a first PCB), in some configurations. The module 108 is a PCB (e.g., a second PCB), in some configurations. Though only one module 108 is shown, multiple modules 108 are aligned and mounted to the base 104, in some embodiments.

Because there may be variations in the positioning of the lasers 120 and/or detectors 122 if mounted directly to the base 104, and/or variations in a thickness of solder between the lasers 120 and/or detectors 122 mounted on the module 108, it may not be sufficient to simply position each module 108 on the base 104 without some alignment. Accordingly, positions of lasers 120 and/or detectors 122 are measured and the module 108 moved with respect to the base 104 to align the lasers 120 and/or detectors 122 with respect to the base 104 and thus with respect to the lens system 116. Separately aligning multiple modules 108 can be particularly beneficial in cases where different modules 108 in the x dimension are positioned at different heights (e.g., height is in the z dimension) with respect to the base 104.

After the module 108 is aligned with the base 104 (e.g., rotated and/or translated), the module 108 is secured to the base 104. For example, the module 108 can be locked into position using screws, glue, solder, mechanical stages, and/or other positioning and/or holding mechanisms.

Figure 2:
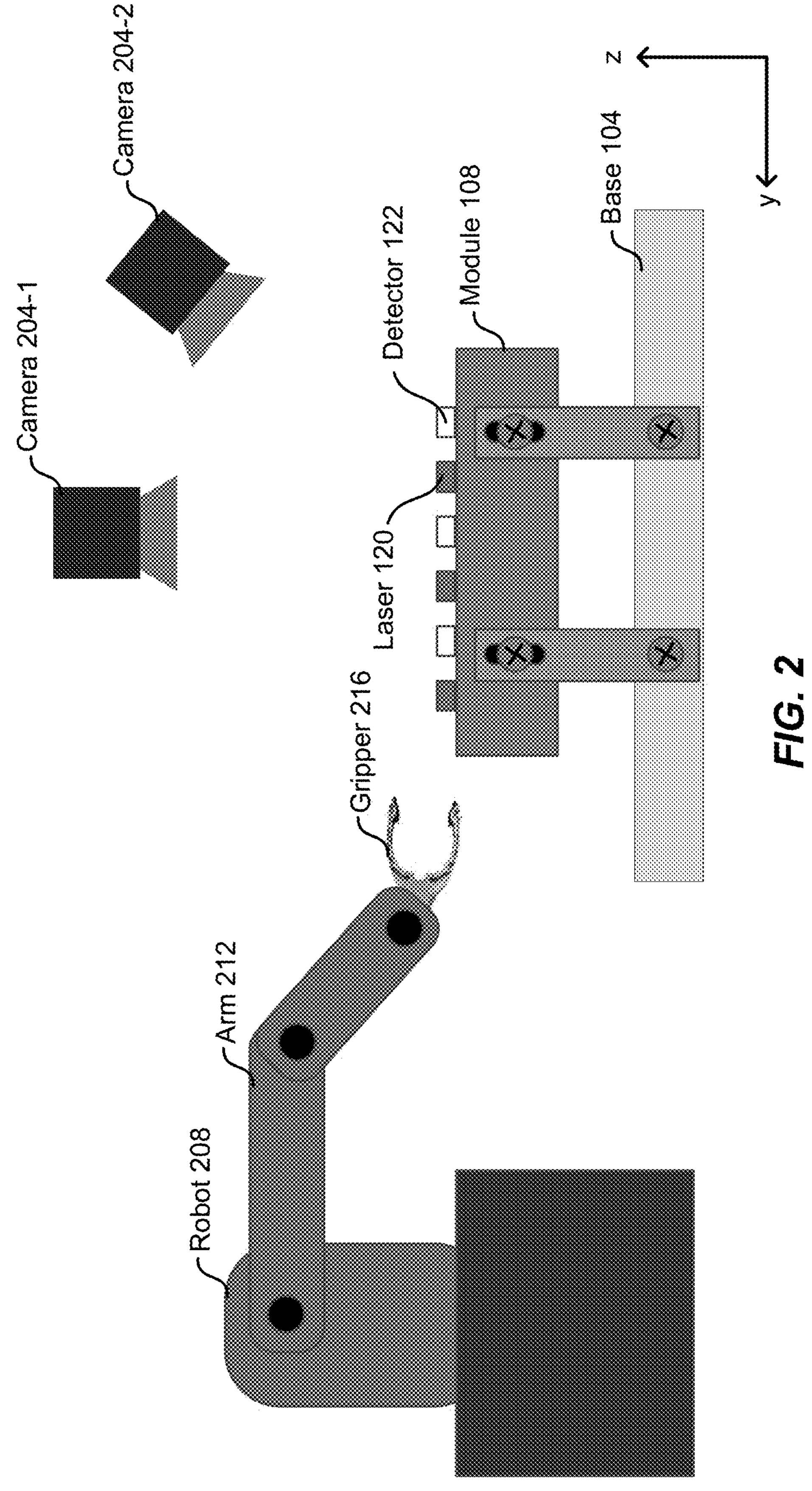
FIG. 2 depicts an embodiment an alignment station.

In FIG. 2, an embodiment of an alignment station is shown. The alignment station comprises a first camera 204-1, a second camera 204-2, and a robot 208. The first camera 204-1 is a top-down camera, and the second camera 204-2 is a side-looking camera. The robot 208 comprises an arm 212 and a gripper 216 to move the module 108 (e.g., to hold onto the module 108) with respect to the base 104. The arm 212 is a multiaxial robotic arm.

The first camera 204-1 and the second camera 204-2 are incorporated into a manufacturing assembly and alignment machine to allow precise placement of the module 108 with respect to base 104 and thus the lens. Using machine vision pattern matching algorithms, the difference between an actual location of a laser(s) 120 and/or detector(s) 122 and a desired location for optical alignment and/or focus (e.g., optimized location), can be ascertained (e.g., calculated). The module 108 can then be repositioned using the robot 208.

It is possible to determine the location of an object in two dimensions using a single camera, but the third dimension can be only approximately determined in the third dimension using only one camera, if the camera is stationary. For example, using the first camera 204-1 as a top-down camera (e.g., looking down along the z axis), an object can be located in x and y, but only roughly in z, depending on whether it is in or out of focus. By adding the second camera 204-2 as a side-looking camera, the object can be triangulated (e.g., using machine vision pattern matching to precisely ascertain the object's position in z as well as x and y).

While the first camera 204-1 may be conveniently pointed along the vertical axis and the second camera 204-2 may be conveniently positioned at a 45-degree angle from vertical, the two cameras 204 may in practice be located at other angles (e.g., as long as they have a view of the object(s) to be located and/or along axes that are different enough to allow accurate triangulation of the object(s)). For example, there could be two, three, four, five, six, or eight cameras 204 at 15, 30, 45, 50, and/or 60 degrees from vertical used to locate a single object in x, y, z space. If multiple objects (e.g., lasers, detectors, and/or locations or features on the module 108) are used, then pitch, roll, and/or yaw of the module 108 can also be ascertained and corrected.

In some embodiments, it is assumed that the position of the optical axis and the focal plane of the lens is accurately known either through optical measurement, mechanical measurement, or careful tolerancing of the lens and assembly. This allows a desired position of the module 108 to be known (e.g., with respect to the base 104) even if the lens system (e.g., lens system 116 in FIG. 1) is removed (e.g., to allow access for the cameras 204 and/or the arm 212 of the robot 208). After the module 108 has been accurately positioned, the module 108 is secured to the base 104 and the lens system coupled with the base 104.

Figure 3:
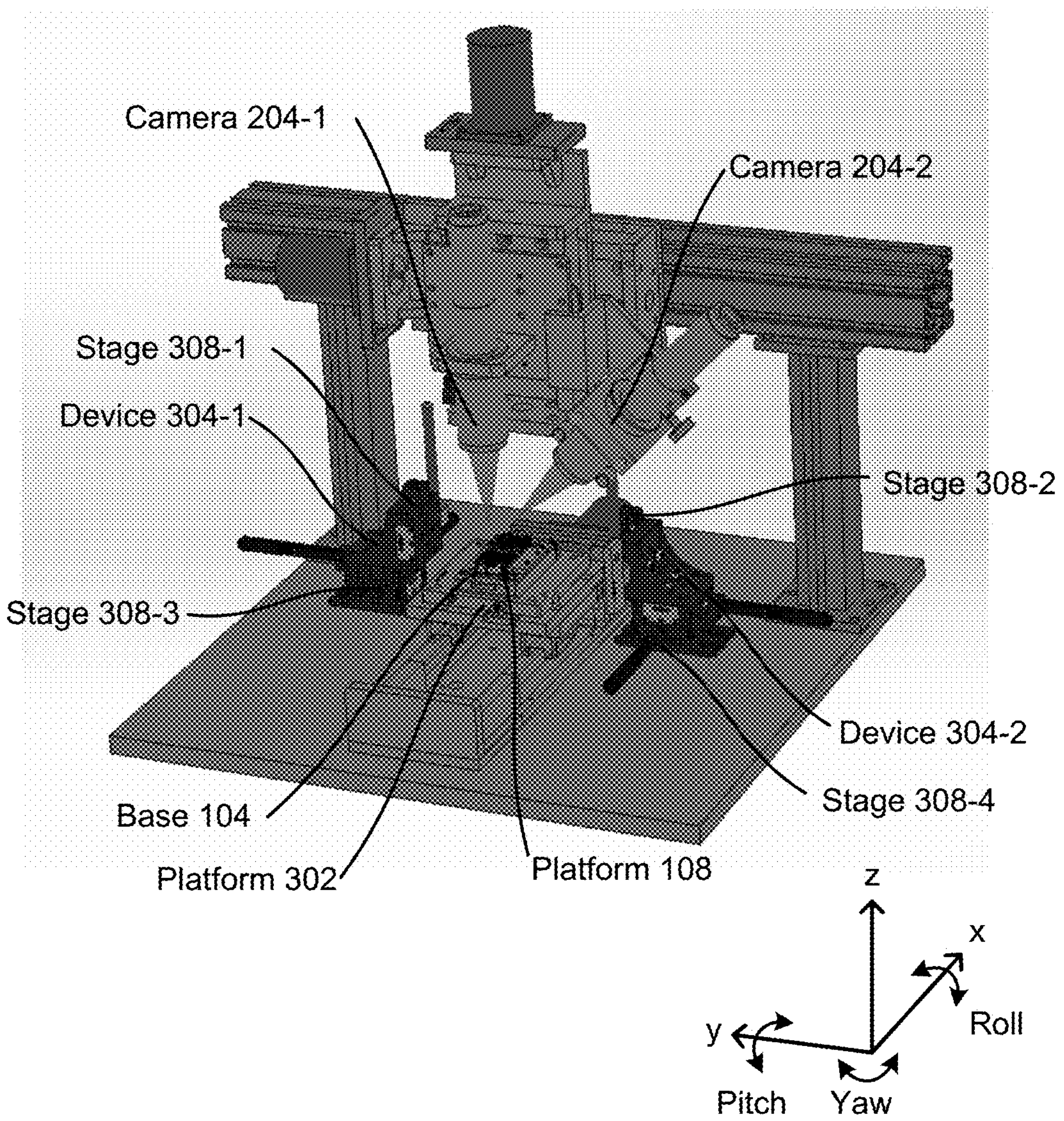
FIG. 3 depicts an embodiment of an alignment station with translating stages.

FIG. 3 depicts an embodiment of a system for an alignment station. The system is used for aligning a component (e.g., module 108) for lidar. Translating stages are used to manipulate modules 108 to desired positions. The system comprises a platform 302, a first device 304-1, a second device 304-2, a first camera 204-1, and a second camera 204-2. The base 104 is positioned on the platform 302. In some embodiments, the platform 302 is arranged to translate (e.g., along the x axis so that two or more modules 108 can be adjusted in sequential order with less movement of the devices 304). The second device 304-2 is separate from the first device 304-1 (e.g., the second device 304-2 is spaced apart from and/or is separately controllable from the first device 340-1).

The first device 304-1 comprises a first stage 308-1. The second device 304-2 comprises a second stage 308-2. Stages 308 are translating stages. The first stage 308-1 and the second stage 308-2 are arranged to translate in a direction parallel to the z axis (or "along the z axis"). The first stage 308-1 is arranged to perform a first translational motion (e.g., along the z axis). The second stage 308-2 is arranged to perform a second translational motion (e.g., along the z axis) coordinated with the first translational motion to rotate a module with respect to the base 104. For example, the module is pinched between the first device 304-1 and the second device 304-2. The first translational motion is in the positive z direction, and the second translational motion is in the negative z direction to rotate the module in the y/z plane (e.g., about the x axis). In some embodiments, the first translational motion and the second translational motion are synchronized (e.g., happening at the same time). In some embodiments, the first stage 308-1 and the second stage 308-2 move at different times. As another example, the first stage 308-1 and the second stage 308-2 could both be moving in the negative z direction. The first stage 308-1 could then stop, and the second stage 308-2 keep moving in the negative z direction to rotate the module into position within the y/z plane to align opto-electronic components on the module 108 to be at desired positions in x, y, z space.

Rotation in the y/z plane, about the x axis (e.g., meaning about an axis parallel to the x axis) is called roll in this disclosure. Rotation in the x/y plane, about the z axis, is called yaw. Rotation in the x/z plane, about the y axis, is called pitch.

A first image is acquired from the first camera 204-1, wherein the first image includes at least a portion of the module. A second image is acquired from the second camera 204-2, wherein the second image includes at least a portion of the module. A desired change in position of the module with respect to the base is calculated, based on the first image and the second image. A first signal is transmitted to the first device 304-1 for the first stage 308-1 to perform the first translational motion. A second signal is transmitted to the second device 304-2 for the second stage 308-2 to perform the second translational motion coordinated with the first translational motion, based on calculating the desired change in position of the module. In some configurations, a third image is acquired using a third camera, and calculating the desired change is further based on the third image.

The first translational motion of the first stage 308-1 and the second translational motion of the second stage 308-2 are arranged to rotate the module 108 about a first axis (e.g., the x axis by translating along the z axis). The first device 304-1 comprises a third stage 308-3. The second device 304-2 comprises a fourth stage 308-4. For example, both the first device 304-1 and the second device 304-2 are each a three-axis motorized linear translation stage, arranged to each translate linear stages along three axes.

The third stage 308-3 is arranged to translate in a direction orthogonal to the first translational motion of the first stage 308-1. For example, the third stage 308-3 is arranged to translate along the x axis. The fourth stage 308-4 is arranged to translate in a direction orthogonal to the second translational motion of the second stage 308-2 (e.g., along the x axis), coordinated with translation of the third stage 308-3, to rotate the module 108 about a second rotational axis (e.g., the z axis). For example, the third stage 308-3 is translated along the positive x axis, while the fourth stage 308-4 is stopped or translated along the negative x axis, to rotate the module 108 about the z axis (e.g., yaw rotation).

Figure 4:
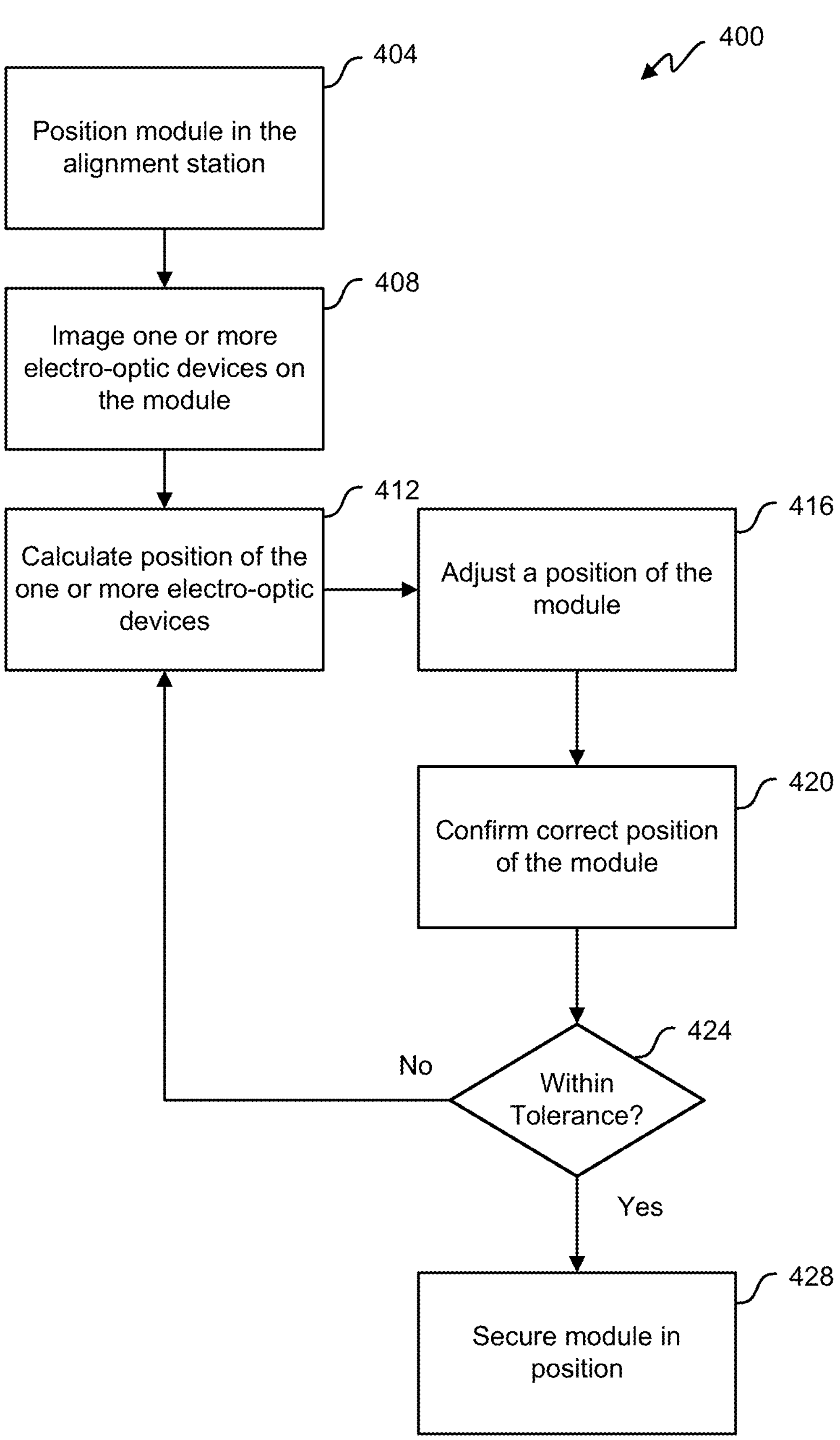
FIG. 4 illustrates an embodiment of a process for automatic alignment of a module.

FIG. 4 illustrates an embodiment of a process 400 for automatic alignment of a module. Process 400 begins in step 404 with positioning the module in the alignment station. For example, the base 104 is positioned on the platform 302, and the module 108 is positioned on the base 104, as shown in FIG. 3.

In step 408 one or more electro-optic devices on the module are imaged. For example, one or more lasers 120 and/or one or more detectors 122 on the module 108 are imaged by the first camera 204-1 and the second camera 204-2, as shown in FIG. 2.

In step 412, a position of one or more electro-optic devices are calculated. For example, machine vision pattern matching is used to precisely calculate x, y, z locations of lasers and/or detectors on the module.

In step 416, a position of the module is adjusted, based on calculating the position of the one or more electro-optic devices. For example, the position of the one or more electro-optic devices is compared to a 3D model and/or to the base to calculate an offset of the actual position of the electro-optic devices to a desired position. The arm 212 in FIG. 2 or translating stages 308 in FIG. 3 are then used to modify the position of the module, in relation to the base, to more closely match the 3D model. For example, the module can be translated (e.g., along an x, y, or z axis) and/or rotated to reposition the module.

In step 420, the position of the module is compared to the desired position to confirm the module is in the correct position. If the position of the module is within a predefined tolerance, then a decision at step 424 proceeds to step 428 to secure the module in position (e.g., with screws, solder, glue, etc.). If the module is not within the predefined tolerance, then the decision at step 424 proceeds to step 412 with calculating the position or to step 416 of adjusting the position of the module.

Figure 5:
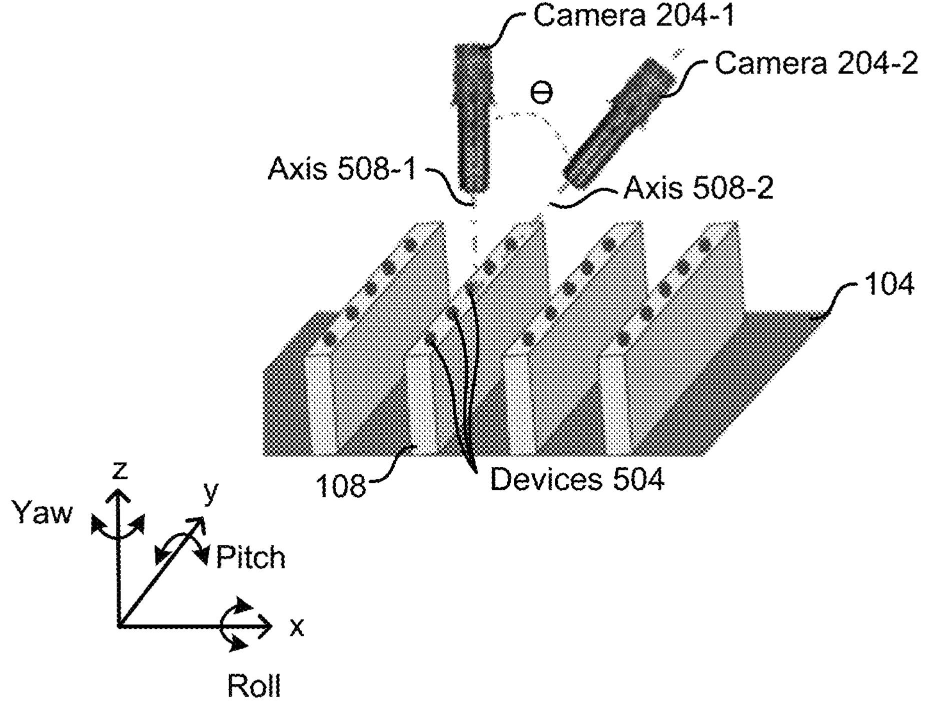
FIG. 5 depicts an embodiment of cameras measuring positions of electro-optic devices on a module.

FIG. 5 depicts an embodiment of cameras 204 used for measuring positions of electro-optic devices 504 on a module 108. FIG. 5 provides a more detailed embodiment of an algorithm for measuring and correcting the position of multiple lasers and/or detectors. The position of each laser or detector, as imaged by the cameras 204 is ascertained by calculating a centroid of a linear array of electro-optic devices 504. Trigonometric corrections to account for an angle θ between the first camera 204-1 and the second camera 204-5 are also provided. A best-fit line (or curve) is fitted through the positions of a plurality of electro-optic devices 504 on the module 108. For example, the plurality of electro-optic devices 504 are in a linear array on the module 108. Positions of at least two electro-optic devices 504 are calculated from a first image acquired by the first camera 204-1 and/or a second image acquired by the second camera 204-2. A deviation from the best-fit line from its ideal location is then used to calculate the error in the position of the module, which can then be corrected.

The first camera 204-1 is characterized by a first optical axis 508-1. The second camera 204-2 is characterized by a second optical axis 508-2. The second camera 204-2 is arranged so that the second optical axis 508-2 is skew to the first optical axis 508-1. In some embodiments, the electro-optical device 504 is a light source arranged to emit upward (e.g., along the z axis), away from the base 104. The first camera 204-1 and the second camera 204-2 are arranged to point angled downward, toward the base 104 (e.g., the first optical axis 508-1 and the second optical axis 508-2 each have a component along the z axis).

Figure 6:
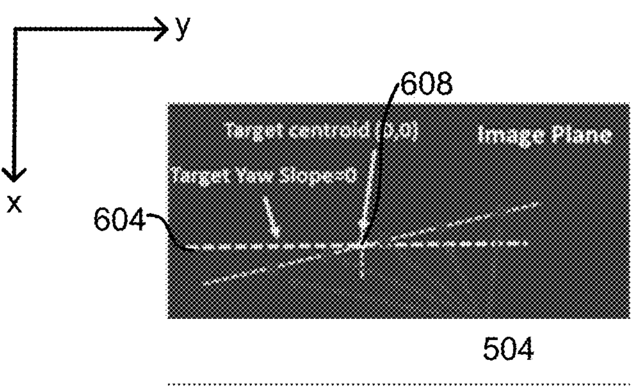
FIG. 6 shows an embodiment of correcting for yaw rotation.

FIG. 6 shows an embodiment of correcting for yaw rotation. FIG. 6 depicts data from a first image acquired by the first camera 204-1 in FIG. 5. The data is in the x, y plane.

In FIG. 6, measured coordinates of devices 504 are shown in relation to a target yaw slope 604. For example, measured coordinates ($x_i$, $y_i$), i=1 . . . n, for n number of devices 504 is shown. A target centroid 608 is also depicted. Centroid position error can be calculated by:

$$\sum_{i=1}^{n} (x_i, y_i) * I(x_i, y_i) \Big/ \sum_{i=1}^{n} I(x_i, y_i),$$

with yaw error being equal to $\delta x_i/\delta y_i$.

Residual error is proportional to camera field of view/pixel density.

Figure 7:
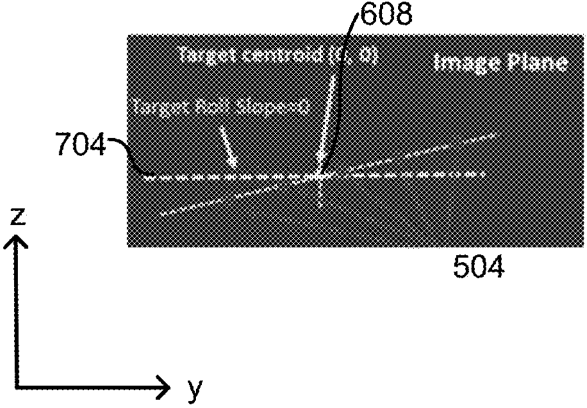
FIG. 7 shows an embodiment of correcting for roll rotation.

FIG. 7 shows an embodiment of correcting for roll rotation. FIG. 7 depicts data from a second image acquired by the second camera 204-2 in FIG. 5. The data is in the y, z plane. In FIG. 7, measured focus of devices 504 is shown in relation to a target roll slope 704. For example, measured focus for devices 504 ($z_i$*sin(θ)), i=1 . . . n, for n number of devices 504 is shown. The target centroid 608 is also shown. Centroid focus error can be calculated by:

$$\sum_{i=1}^{n} (z_i) * I(z_i) \Big/ \sum_{i=1}^{n} I(z_i),$$

with roll error equal to the actual slope.

Residual error is proportional to camera field of view/pixel centroid error/sin(O).

Figure 8:
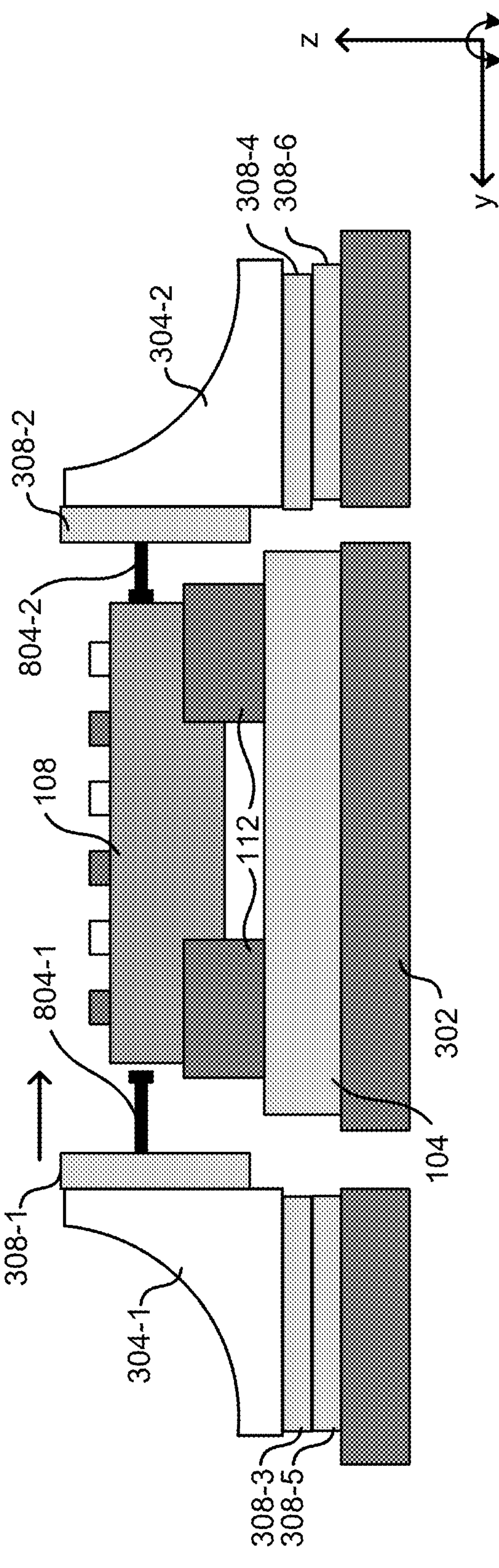
FIG. 8 depicts an embodiment of translation stages manipulating a module.

FIG. 8 depicts an embodiment of translation stages 308 manipulating a module 108 with respect to a base 104. The base 104 is positioned on a platform 302. In FIG. 8, a first device 304-1 and a second device 304-2 are used to manipulate the module 108.

The first device 304-1 comprises a first stage 308-1, a third stage 308-3, a fifth stage 308-5, and a first contact 804-1. The second device 304-2 comprises a second stage 308-2, a fourth stage 308-4, a sixth stage 308-6, and a second contact 804-2. The first stage 308-1 is arranged to move along the z axis, which moves the first contact 804-1 in the z direction. The second stage 308-2 is arranged to move along the z axis, which moves the second contact 804-2 in the z direction. The third stage 308-3 is arranged to move along the x axis, which moves the first contact 804-1 in the x direction. The fourth stage 308-4 is arranged to move along the x axis, which moves the second contact 804-2 in the x direction. The fifth stage 308-5 is arranged to move along the y axis, which moves the first contact 804-1 in the y direction. The sixth stage 308-6 is arranged to move along the y axis, which moves the second contact 804-2 in the y direction.

The contact 804 is a tension contact. For example, the contact 804 has a spring so that as the device 304 is moved toward the module 108 along the y axis (e.g., by the fifth stage 308-5 or the sixth stage 308-6) the contact 804 applies pressure against the module 108. In some embodiments the device 304 comprises a pressure sensor to measure an amount of pressure against the module applied by the contact 804 (e.g., to stop the device 304 from continuing to move toward the module 108). FIG. 8 shows the first device 304-1 moving toward the module 108 along the y axis before the first contact 804-1 touches the module 108.

After the first device 304-1 moves in the negative y direction, the first contact 804-1 and the second contact 804-2 will concurrently apply pressure to the module 108 and be able to manipulate the module 108. For example, the module 108 can be moved up, in the positive z direction, by the first stage 308-1 and the second stage 308-2 moving (i.e., translating) in the positive z direction. The first device 304-1 and the second device 304-2 can roll (i.e., rotate the module 108 about the x axis) by the first stage 308-1 moving in the positive z direction and the second stage 308-2 moving in the positive z direction slower than the first stage 308-1, not moving, or moving in the negative z direction. Thus, the motion of the second stage 308-2 is parallel to the motion of the first stage 308-1 and can be in the same direction (e.g., for translation of the module 108) or in the opposite direction (e.g., for rotation of the module 108). The module 108 can be translated and rotated if the second stage 308-2 is moving in the same direction as the first stage 308-1 but at a different speed. A person skilled in the art will recognize additional variations. Similarly, the third stage 308-3 and the fourth stage 308-4 can translate the module 108 along the x axis and rotate the module 108 about the z axis (yaw rotation). Thus, the devices 304 can translate the module 108 in three degrees of freedom and rotate the module 108 in two degrees of freedom.

The stages 308 of the device 304 manipulate the module 108 to align the module 108 with respect to the base 104. After the module is aligned, the module 108 is secured to the mounts 112. In some embodiments, the mounts 112 are slots for the module 108 to slide in.

While the examples show the lens system as being fixed and the position of the module (e.g., EOM) being adjusted, it is also possible to design the optical system and alignment system such that the module is fixed to the base and the lens position is adjusted relative to the base. The base may be a mechanical mount, a case, a PCB, or other mechanical part that the lens(es) and/or module attach (e.g., mount) to.

Figure 9:
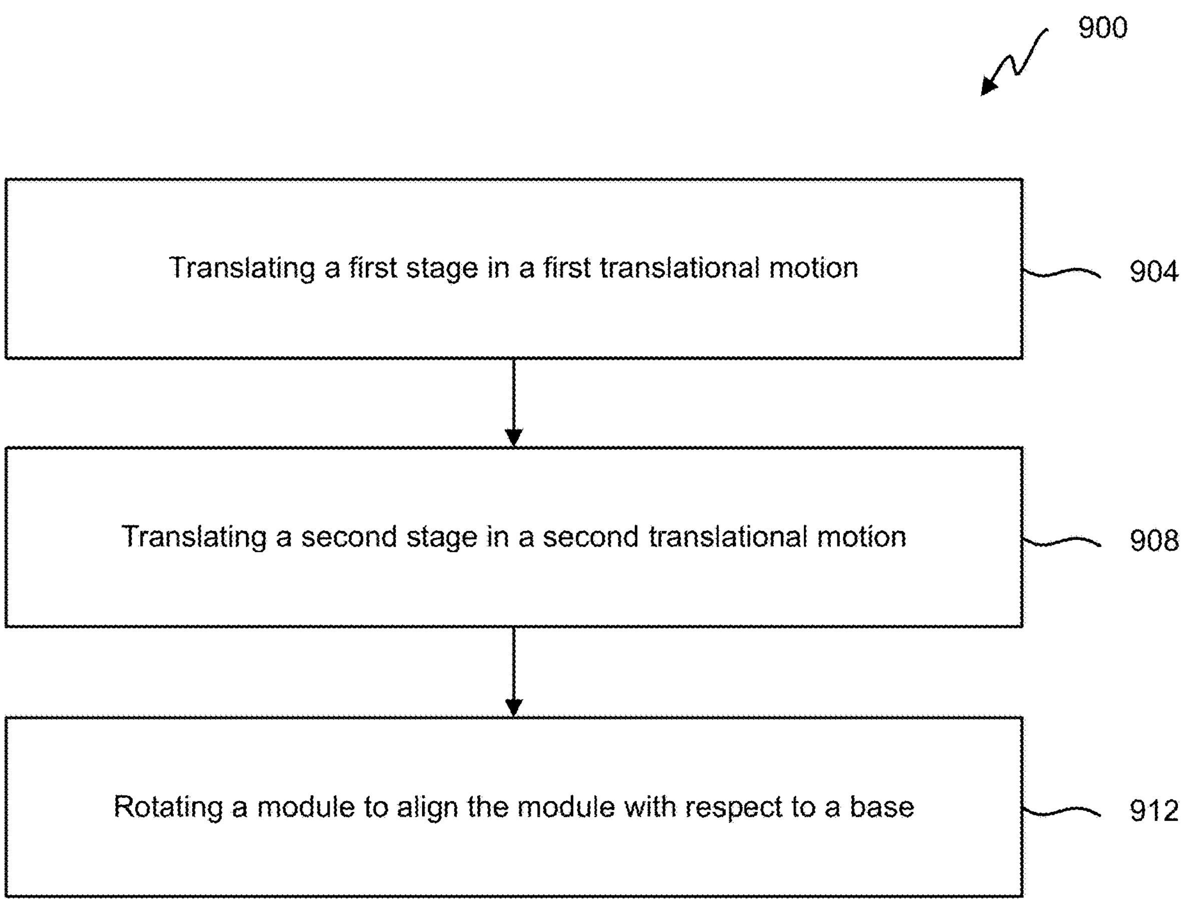
FIG. 9 illustrates a flowchart of an embodiment of a process for positioning an electro-optical module for lidar.

FIG. 9 illustrates a flowchart of an embodiment of a process 900 for positioning an electro-optical module for lidar. Process 900 begins in step 904 with translating a first stage of a first device to perform a first translational motion. For example, the first stage 308-1 in FIG. 8 translates in the positive z direction.

In step 908, a second stage is translated in coordination with the first translational motion. For example, the second stage 308-2 in FIG. 8 translates along the z axis (e.g., in the positive z direction at a slower speed, at different times, and/or in the negative z direction) to rotate, step 912, the module with respect to a base to align the module. The module comprises an electro-optic device, such as a laser or a detector.

In some embodiments, the method comprises acquiring a first image from a first camera (e.g., the first camera 204-1 in FIG. 2, 3, or 5), wherein the first image includes at least a portion of the module, the first camera is characterized by a first optical axis (e.g., as shown in FIG. 5); acquiring a second image from a second camera (e.g., as shown in FIG. 2, 3, or 5), wherein the second image includes at least a portion of the module, the second camera characterized by a second optical axis (e.g., as shown in FIG. 5), and the second camera is arranged so that the second optical axis is skew in relation to the first optical axis so that the second image of the module is skew to the first image of the module. A desired change in position of the module with respect to the base is calculated based on the first image and the second image (e.g., as shown in FIGS. 6 and 7).

In some implementations, the second stage is moved to perform the second translational motion synchronously and/or in coordination with the first translational motion, based on calculating the desired change in position of the module (e.g., to translate and/or rotate the module). The module is secured in place after positioning (e.g., translating and/or rotating) the module.

In some embodiments, a first signal is generated to transmit to the first device for the first stage to perform a first translational motion; a second signal is generated to transmit to the second device for the second stage to perform a second translational motion synchronously and/or in coordination with the first translational motion to rotate the module with respect to a base.

In some embodiments, a system for positioning a module for lidar comprises a mechanical device arranged to adjust a position of a module in relation to a base, wherein the module comprises an electro-optical device; a first camera characterized by a first optical axis; a second camera characterized by a second optical axis, wherein the second camera is arranged so that the second optical axis is skew to the first optical axis; and/or one or more memory device comprising instructions that, when executed by one or more processors, performs the following steps: acquiring a first image from the first camera, wherein the first image includes at least a portion of the module; acquiring a second image from the second camera, wherein the second image includes at least the portion of the module; and calculating, based on the first image and the second image, a desired change in position and/or orientation of the module with respect to the base. In some embodiments the module comprises an array of lasers and changing the position and/or orientation of the module aligns the array of lasers with a base for alignment with a lens system. The system can comprise a robotic art and/or one or more translating stages (e.g., as shown in FIGS. 2, 3, and 8) for manipulating the module to a desired position and/or orientation.

In some embodiments, a method for positioning a module for lidar comprises acquiring a first image from a first camera, wherein the first image includes at least a portion of a module, the module includes an electro-optics device, and the first camera is characterized by a first optical axis; acquiring a second image from a second camera, wherein the second image includes at least a portion of the module, the second camera characterized by a second optical axis, and the second camera is arranged so that the second optical axis is skew in relation to the first optical axis so that the second image of the module is skew to the first image of the module; calculating, based on the first image and the second image, a desired change in position and/or orientation of the module with respect to a base; and/or moving the module with respect to the base in at least two degrees of freedom, using a mechanical device, based on the desired change calculated from the first image and the second image.

Figure 10:
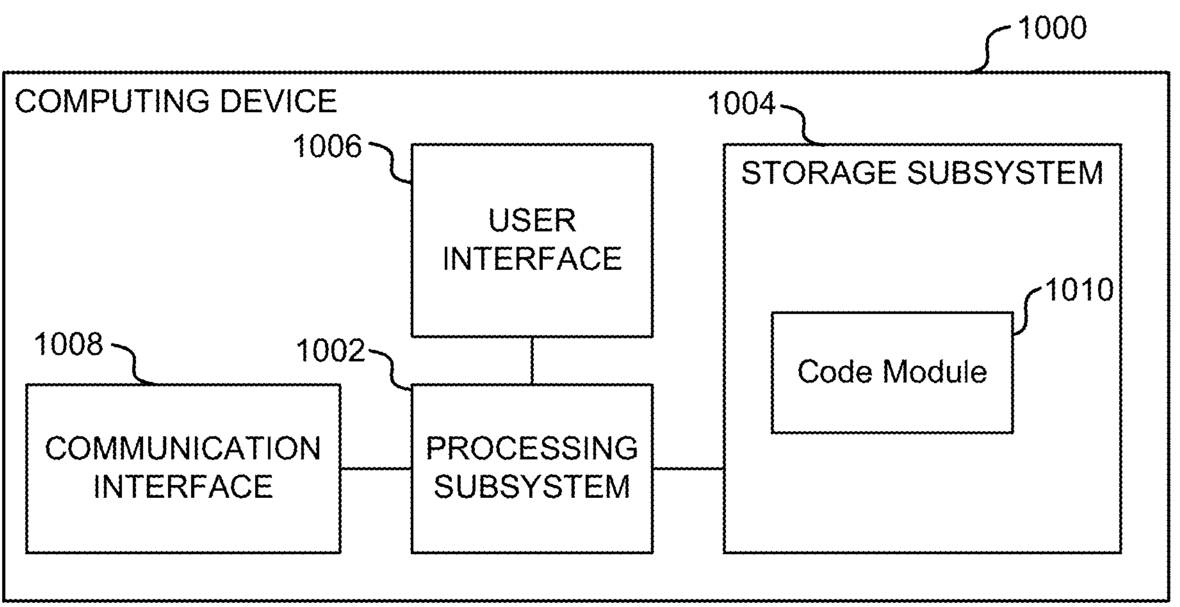
FIG. 10 depicts a block diagram of an embodiment of a computer system.

FIG. 10 is a simplified block diagram of a computing device 1000. Computing device 1000 can implement some or all functions, behaviors, and/or capabilities described above that would use electronic storage or processing, as well as other functions, behaviors, or capabilities not expressly described. Computing device 1000 includes a processing subsystem 1002, a storage subsystem 1004, a user interface 1006, and/or a communication interface 1008. Computing device 1000 can also include other components (not explicitly shown) such as a battery, power controllers, and other components operable to provide various enhanced capabilities. In various embodiments, computing device 1000 can be implemented in a desktop or laptop computer, mobile device (e.g., tablet computer, smart phone, mobile phone), media device, application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, or electronic units designed to perform a function or combination of functions described above.

Storage subsystem 1004 can be implemented using a local storage and/or removable storage medium, e.g., using disk, flash memory (e.g., secure digital card, universal serial bus flash drive), or any other non-transitory storage medium, or a combination of media, and can include volatile and/or non-volatile storage media. Local storage can include random access memory (RAM), including dynamic RAM (DRAM), static RAM (SRAM), or battery backed up RAM. In some embodiments, storage subsystem 1004 can store one or more applications and/or operating system programs to be executed by processing subsystem 1002, including programs to implement some or all operations described above that would be performed using a computer. For example, storage subsystem 1004 can store one or more code modules 1010 for implementing one or more method steps described above.

A firmware and/or software implementation may be implemented with modules (e.g., procedures, functions, and so on). A machine-readable medium tangibly embodying instructions may be used in implementing methodologies described herein. Code modules 1010 (e.g., instructions stored in memory) may be implemented within a processor or external to the processor. As used herein, the term "memory" refers to a type of long term, short term, volatile, nonvolatile, or other storage medium and is not to be limited to a particular type of memory or number of memories or type of media upon which memory is stored.

Moreover, the term "storage medium" or "storage device" may represent one or more memories for storing data, including read only memory (ROM), RAM, magnetic RAM, core memory, magnetic disk storage mediums, optical storage mediums, flash memory devices and/or other machine-readable mediums for storing information. The term "machine-readable medium" includes, but is not limited to, portable or fixed storage devices, optical storage devices, wireless channels, and/or various other storage mediums capable of storing instruction(s) and/or data.

Furthermore, embodiments may be implemented by hardware, software, scripting languages, firmware, middleware, microcode, hardware description languages, and/or any combination thereof. When implemented in software, firmware, middleware, scripting language, and/or microcode, program code or code segments to perform tasks may be stored in a machine-readable medium such as a storage medium. A code segment (e.g., code module 1010) or machine-executable instruction may represent a procedure, a function, a subprogram, a program, a routine, a subroutine, a module, a software package, a script, a class, or a combination of instructions, data structures, and/or program statements. A code segment may be coupled to another code segment or a hardware circuit by passing and/or receiving information, data, arguments, parameters, and/or memory contents. Information, arguments, parameters, data, etc., may be passed, forwarded, or transmitted by suitable means including memory sharing, message passing, token passing, network transmission, etc.

Implementation of the techniques, blocks, steps, and means described above may be done in various ways. For example, these techniques, blocks, steps, and means may be implemented in hardware, software, or a combination thereof. For a hardware implementation, the processing units may be implemented within one or more ASICs, DSPs, DSPDs, PLDs, FPGAs, processors, controllers, micro-controllers, microprocessors, other electronic units designed to perform the functions described above, and/or a combination thereof.

Each code module 1010 may comprise sets of instructions (codes) embodied on a computer-readable medium that directs a processor of a computing device 1000 to perform corresponding actions. The instructions may be configured to run in sequential order, in parallel (such as under different processing threads), or in a combination thereof. After loading a code module 1010 on a general-purpose computer system, the general-purpose computer is transformed into a special-purpose computer system.

Computer programs incorporating various features described herein (e.g., in one or more code modules 1010) may be encoded and stored on various computer-readable storage media. Computer-readable media encoded with the program code may be packaged with a compatible electronic device, or the program code may be provided separately from electronic devices (e.g., via Internet download or as a separately packaged computer-readable storage medium). Storage subsystem 1004 can also store information useful for establishing network connections using the communication interface 1008.

User interface 1006 can include input devices (e.g., touch pad, touch screen, scroll wheel, click wheel, dial, button, switch, keypad, microphone, etc.), as well as output devices (e.g., video screen, indicator lights, speakers, headphone jacks, virtual- or augmented-reality display, etc.), together with supporting electronics (e.g., digital-to-analog or analog-to-digital converters, signal processors, etc.). A user can operate input devices of user interface 1006 to invoke the functionality of computing device 1000 and can view and/or hear output from computing device 1000 via output devices of user interface 1006. For some embodiments, the user interface 1006 might not be present (e.g., for a process using an ASIC).

Processing subsystem 1002 can be implemented as one or more processors (e.g., integrated circuits, one or more single-core or multi-core microprocessors, microcontrollers, central processing unit, graphics processing unit, etc.). In operation, processing subsystem 1002 can control the operation of computing device 1000. In some embodiments, processing subsystem 1002 can execute a variety of programs in response to program code and can maintain multiple concurrently executing programs or processes. At a given time, some or all of a program code to be executed can reside in processing subsystem 1002 and/or in storage media, such as storage subsystem 1004. Through programming, processing subsystem 1002 can provide various functionality for computing device 1000. Processing subsystem 1002 can also execute other programs to control other functions of computing device 1000, including programs that may be stored in storage subsystem 1004.

Communication interface 1008 can provide voice and/or data communication capability for computing device 1000. In some embodiments, communication interface 1008 can include radio frequency (RF) transceiver components for accessing wireless data networks (e.g., Wi-Fi network; 3G, 4G/LTE; etc.), mobile communication technologies, components for short-range wireless communication (e.g., using Bluetooth communication standards, NFC, etc.), other components, or combinations of technologies. In some embodiments, communication interface 1008 can provide wired connectivity (e.g., universal serial bus, Ethernet, universal asynchronous receiver/transmitter, etc.) in addition to, or in lieu of, a wireless interface. Communication interface 1008 can be implemented using a combination of hardware (e.g., driver circuits, antennas, modulators/demodulators, encoders/decoders, and other analog and/or digital signal processing circuits) and software components. In some embodiments, communication interface 1008 can support multiple communication channels concurrently. In some embodiments, the communication interface 1008 is not used.

It will be appreciated that computing device 1000 is illustrative and that variations and modifications are possible. A computing device can have various functionality not specifically described (e.g., voice communication via cellular telephone networks) and can include components appropriate to such functionality.

Further, while the computing device 1000 is described with reference to particular blocks, it is to be understood that these blocks are defined for convenience of description and are not intended to imply a particular physical arrangement of component parts. For example, the processing subsystem 1002, the storage subsystem 1004, the user interface 1006, and/or the communication interface 1008 can be in one device or distributed among multiple devices.

Further, the blocks need not correspond to physically distinct components. Blocks can be configured to perform various operations, e.g., by programming a processor or providing appropriate control circuitry, and various blocks might or might not be reconfigurable depending on how an initial configuration is obtained. Embodiments of the present invention can be realized in a variety of apparatus including electronic devices implemented using a combination of circuitry and software. Electronic devices described herein can be implemented using computing device 1000.

Various features described herein, e.g., methods, apparatus, computer-readable media, and the like, can be realized using a combination of dedicated components, programmable processors, and/or other programmable devices. Some processes described herein can be implemented on the same processor or different processors. Where some components are described as being configured to perform certain operations, such configuration can be accomplished, e.g., by designing electronic circuits to perform the operation, by programming programmable electronic circuits (such as microprocessors) to perform the operation, or a combination thereof. Further, while the embodiments described above may refer to specific hardware and software components, those skilled in the art will appreciate that different combinations of hardware and/or software components may also be used and that particular operations described as being implemented in hardware might be implemented in software or vice versa.

Details are given in the above description to provide an understanding of the embodiments. However, it is understood that the embodiments may be practiced without some of the specific details. Examples in different figures may be combined in various ways to enhance performance or modified for a specific application. In some instances, well-known circuits, processes, algorithms, structures, and techniques are not shown in the figures.

While the principles of the disclosure have been described above in connection with specific apparatus and methods, it is to be understood that this description is made only by way of example and not as limitation on the scope of the disclosure. Embodiments were chosen and described in order to explain principles and practical applications to enable others skilled in the art to utilize the invention in various embodiments and with various modifications, as are suited to a particular use contemplated. It will be appreciated that the description is intended to cover modifications and equivalents.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc.

A recitation of "a", "an", or "the" is intended to mean "one or more" unless specifically indicated to the contrary. Patents, patent applications, publications, and descriptions mentioned here are incorporated by reference in their entirety for all purposes. None is admitted to be prior art.

The specific details of particular embodiments may be combined in any suitable manner without departing from the spirit and scope of embodiments of the invention. However, other embodiments of the invention may be directed to specific embodiments relating to each individual aspect, or specific combinations of these individual aspects.

The above description of embodiments of the invention has been presented for the purposes of illustration and description. It is not intended to be exhaustive or to limit the invention to the precise form described, and many modifications and variations are possible in light of the teaching above. The embodiments were chosen and described in order to explain the principles of the invention and its practical applications to thereby enable others skilled in the art to utilize the invention in various embodiments and with various modifications as are suited to the particular use contemplated.

What is claimed is:

1. A system for aligning a component for lidar comprising:

a platform arranged for positioning a base on the platform;

a first device comprising a first stage; and a second device comprising a second stage, wherein:

the first stage is arranged to perform a first translational motion to exert a force on a module; and the second stage is arranged to perform a second translational motion to exert a force on the module, coordinated with the first translational motion, to rotate the module with respect to the base to align an electro-optical device on the module with respect to the base.

2. The system of claim 1, further comprising:

a first camera characterized by a first optical axis;

a second camera characterized by a second optical axis, wherein:

the second camera is arranged so that the second optical axis is skew to the first optical axis; and the first camera and the second camera are arranged to acquire images of the module.

3. The system of claim 2, further comprising one or more memory devices comprising instructions that, when executed by one or more processors, performs the following steps:

acquiring a first image from the first camera, wherein the first image includes at least a portion of the module;

acquiring a second image from the second camera, wherein the second image includes at least the portion of the module;

calculating, based on the first image and the second image, a desired change in position of the module with respect to the base;

transmitting a first signal to the first device for the first stage to perform the first translational motion; and transmitting a second signal to the second device for the second stage to perform the second translational motion coordinated with the first translational motion, based on calculating the desired change in position of the module.

4. The system of claim 2, wherein the first camera and the second camera are arranged to point angled downward, toward the base.

5. The system of claim 1, wherein:

the first device comprises a first tension contact;

the second device comprises a second tension contact; and the first tension contact and the second tension contact are arranged to concurrently apply pressure to the module.

6. The system of claim 1, wherein the second translational motion is arranged to be parallel to and in an opposite direction of the first translational motion.

7. The system of claim 1, wherein:

the first translational motion of the first stage and the second translational motion of the second stage are arranged to rotate the module about a first axis;

the first device comprises a third stage;

the second device comprises a fourth stage;

the third stage is arranged to translate in a direction orthogonal to the first translational motion of the first stage; and the fourth stage is arranged to translate in a direction orthogonal to the second translational motion of the second stage, concurrently with translation of the third stage, to rotate the module about a second rotational axis.

8. The system of claim 1, wherein the first stage is a linear translation stage.

9. The system of claim 1, wherein the first device is three-axis motorized linear translation stage.

10. The system of claim 1, wherein:

the electro-optical device is arranged on the module to emit or detect light; and the first stage and the second stage are arranged to manipulate the module to align the electro-optical device with respect to the base.

11. A method for positioning a module for lidar comprising:

translating a first stage of a first device to perform a first translational motion to exert a force on the module;

translating a second stage of a second device to perform a second translational motion to exert a force on the module, coordinated with the first translational motion, to rotate the module with respect to a base, wherein:

the module comprises an electro-optic device; and rotating the module aligns the electro-optic device of the module with respect to the base.

12. The method of claim 11, further comprising:

acquiring a first image from a first camera, wherein:

the first image includes at least a portion of the module; and the first camera is characterized by a first optical axis;

acquiring a second image from a second camera, wherein:

the second image includes at least the portion of the module;

the second camera characterized by a second optical axis; and the second camera is arranged so that the second optical axis is skew in relation to the first optical axis so that the second image of the module is skew to the first image of the module;

calculating, based on the first image and the second image, a desired change in position of the module with respect to the base;

moving the first stage to perform the first translational motion; and moving the second stage to perform the second translational motion coordinated with the first translational motion, based on calculating the desired change in position of the module.

13. The method of claim 12, further comprising calculating positions of at least two objects on the module from the first image and the second image to calculate the desired change in position of the module.

14. The method of claim 11, further comprising securing the module in place in relation to the base after rotating the module so as to prevent relative movement between the module and the base.

15. The method of claim 11, wherein the electro-optic device is one of a plurality of electro-optic devices on the module.

16. A memory device comprising instructions that, when executed by one or more processors, performs the following steps:

generating a first signal to transmit to a first device for a first stage to perform a first translational motion to exert a force on a module;

generating a second signal to transmit to a second device for a second stage to perform a second translational motion to exert a force on the module, coordinated with the first translational motion, to rotate the module with respect to a base, wherein:

the module comprises an electro-optic device; and rotating the module enables aligning the electro-optic device of the module with respect to the base.

17. The memory device of claim 16, wherein the instructions, when executed, further cause the one or more processors to perform the following steps:

acquiring a first image from a first camera, wherein:

the first image includes at least a portion of the module; and the first camera is characterized by a first optical axis;

acquiring a second image from a second camera, wherein:

the second image includes at least the portion of the module;

the second camera characterized by a second optical axis; and the second camera is arranged so that the second optical axis is skew in relation to the first optical axis so that the second image of the module is skew to the first image of the module;

calculating, based on the first image and the second image, a desired change in position of the module with respect to the base;

transmitting the first signal to the first device for the first stage to perform the first translational motion; and transmitting the second signal to the second device for the second stage to perform the second translational motion coordinated with the first translational motion, based on calculating the desired change in position of the module.

18. The memory device of claim 16, wherein the second translational motion parallel to and in an opposite direction of the first translational motion.

19. The memory device of claim 16, wherein:

the first translational motion of the first stage and the second translational motion of the second stage are arranged to rotate the module about a first axis;

the instructions, when executed, further cause the one or more processors to:

transmit a third signal to the first device for a third stage to translate in a direction orthogonal to the first translational motion of the first stage; and transmit a fourth signal to the second device for a fourth stage to translate in a direction orthogonal to the second translational motion of the second stage, concurrently with translation of the third stage, to rotate the module about a second rotational axis.

20. The memory device of claim 16, wherein the first stage is a linear translation stage.

* * * * *